US006752680B1

United States Patent
Hansen

(10) Patent No.: US 6,752,680 B1
(45) Date of Patent: Jun. 22, 2004

(54) TOY BUILDING SET WITH A MEASURING SENSOR

(75) Inventor: Jørn Skovløber Hansen, Ansager (DK)

(73) Assignee: Interlego AG, Baar (CH)

( * ) Notice: Subject to any disclaimer, the term of this patent is extended or adjusted under 35 U.S.C. 154(b) by 0 days.

(21) Appl. No.: 10/130,617

(22) PCT Filed: Nov. 16, 2000

(86) PCT No.: PCT/DK00/00639
§ 371 (c)(1),
(2), (4) Date: Aug. 12, 2002

(87) PCT Pub. No.: WO01/36915
PCT Pub. Date: May 25, 2001

(30) Foreign Application Priority Data

Nov. 17, 1999 (DK) .......................... 1999 01652

(51) Int. Cl.⁷ ..................... A63H 33/04; A63H 32/08
(52) U.S. Cl. ..................... 446/91; 446/124; 446/128
(58) Field of Search .................... 446/85–128

(56) References Cited

U.S. PATENT DOCUMENTS

| 4,556,393 | A | * | 12/1985 | Bolli | 446/91 |
| 5,042,972 | A | * | 8/1991 | Bach et al. | 446/91 |
| 5,962,839 | A | * | 10/1999 | Eskildsen | 235/472.01 |
| 6,206,745 | B1 | * | 3/2001 | Gabai et al. | 446/91 |
| 6,454,624 | B1 | * | 9/2002 | Duff et al. | 446/91 |
| 6,547,624 | B1 | * | 4/2003 | Bojesen et al. | 446/85 |
| 6,575,802 | B2 | * | 6/2003 | Yim et al. | 446/91 |

\* cited by examiner

Primary Examiner—Jacob K. Ackun
Assistant Examiner—Faye Francis
(74) Attorney, Agent, or Firm—Pitney Hardin LLP

(57) ABSTRACT

A toy building set comprising: a sensor (200, 301) capable of recording revolution of a wheel (501, 502), a computer (101, 303) having a display (302), said computer (101, 303) being connectible to the sensor (200, 301) for receiving a revolution signal (S) from the sensor, said computer being capable of converting the revolution signal into a value in dependence on a factor, said value representing the revolution and being displayable on the display. The sensor (200, 301) comprises coupling means (210) for coupling to building elements (101, 504, 505) having complementary coupling means (107), said coupling means being arranged in a modular system with modular units (M1, M2), and the computer (101, 303) is arranged such that the factor may be specified by stating a transverse dimension of the wheel in a plurality of modular unit (M1, M2). The computer may thereby be set to a wheel size in a simple manner.

12 Claims, 5 Drawing Sheets

Figure 1E:
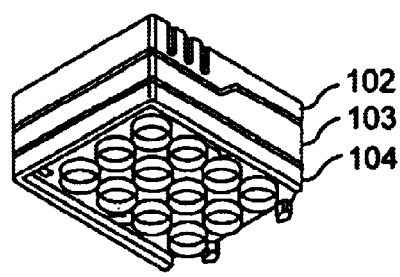
Figure 1F:
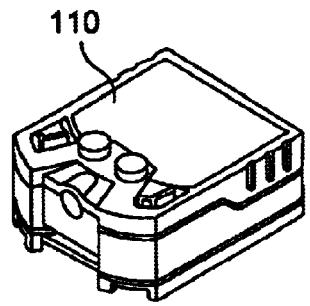
Figure 1D:
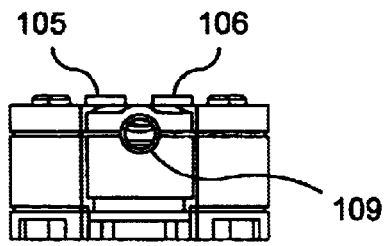
Figures 1A, 1B, 1C:
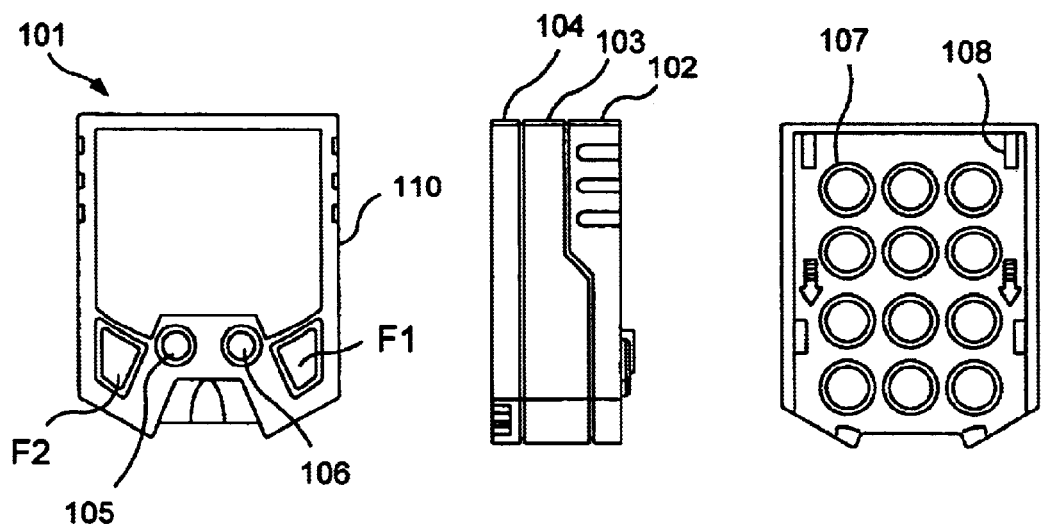

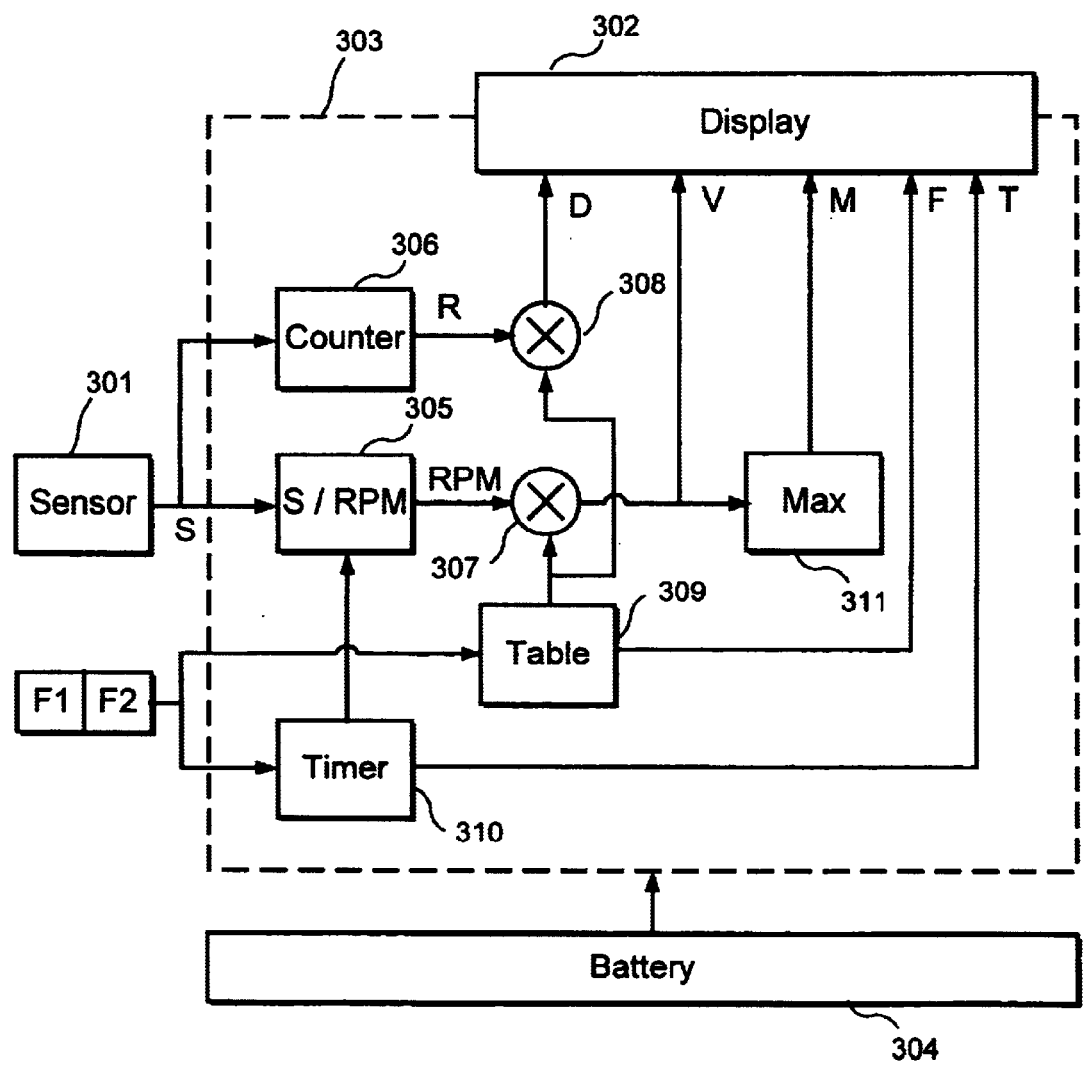
F I G. 3

TOY BUILDING SET WITH A MEASURING SENSOR

This invention relates to a toy building set comprising a sensor capable of recording revolution of a wheel, a computer having a display, said computer being connectible to the sensor for receiving a revolution signal from the sensor, said computer being capable of converting the revolution signal into a value in dependence on a factor, said value representing the revolution and being displayable able on the display.

U.S. Pat. No. 4,071,892 discloses a bicycle computer which can detect revolution of a bicycle wheel and on the basis of this calculate various quantities, as e.g. distance covered, average speed, etc. Bicycle cycle computers of this type typically receive a signal which contains a pulse for each revolution of the wheel. In order to be able to calculate the mentioned quantities, such as speed and distance covered, the bicycle computer must be set to the wheel size concerned. This is done by measuring the circumference of the wheel and specifying it to the bicycle computer. As it is the circumference of the wheel that is measured and specified, it is ensured that the bicycle computer can calculate the various quantities with a sufficiently high accuracy.

However, it is a problem that the setting procedure for bicycle computers is cumbersome. Particularly children whose motor function is not fully developed have difficulty in arranging a measuring band around the wheel, reading a precise measurement and then entering it into the bicycle computer. It is moreover a problem that children playing with a toy building set typically do not have a measuring band at their disposal.

Accordingly, an object of the invention is to provide an intuitive and easy-to-use calibration of a computer which forms part of a toy building system.

This is achieved when the toy building set mentioned in the opening paragraph is characterized in that the sensor comprises coupling means for coupling to building elements having complementary coupling means, said coupling means being arranged in a modular system having modular measures, and that the computer is adapted such that the conversion factor may be specified by stating a transverse dimension for the wheel in a plurality of modular units.

As the size of the wheel is stated in a plurality of modular units that can be counted, the diameter of the wheel may be determined by stacking a suitable number of building blocks on top of each other until the stack of blocks matches the diameter of wheel. Then the number of blocks is counted, and this number is selected by operating the computer.

In spite of there being selected a relatively rough resolution in the form of the size of a module, a relatively fine accuracy of the read value may be achieved, as it is possible to associate a precise conversion factor with a given modular measure. Since the computer forms part of a toy building set, it is particularly evident to test it in various structures, and therefore it is particularly expedient that the calibration can take place in a manner which is simple and rapid for a child and does not require assistance from adults.

A child playing with a toy building set according to the invention will hereby have some relatively advanced functions at its disposal. These functions are interesting to children who often find it exciting to compete and measure their own performances.

It is hereby possible to measure e.g. speed and distance covered for a vehicle composed of parts in a toy building set.

Expedient embodiments of the invention are defined in the dependent claims.

The invention will now be explained with reference to the drawing, in which

Figure 2:
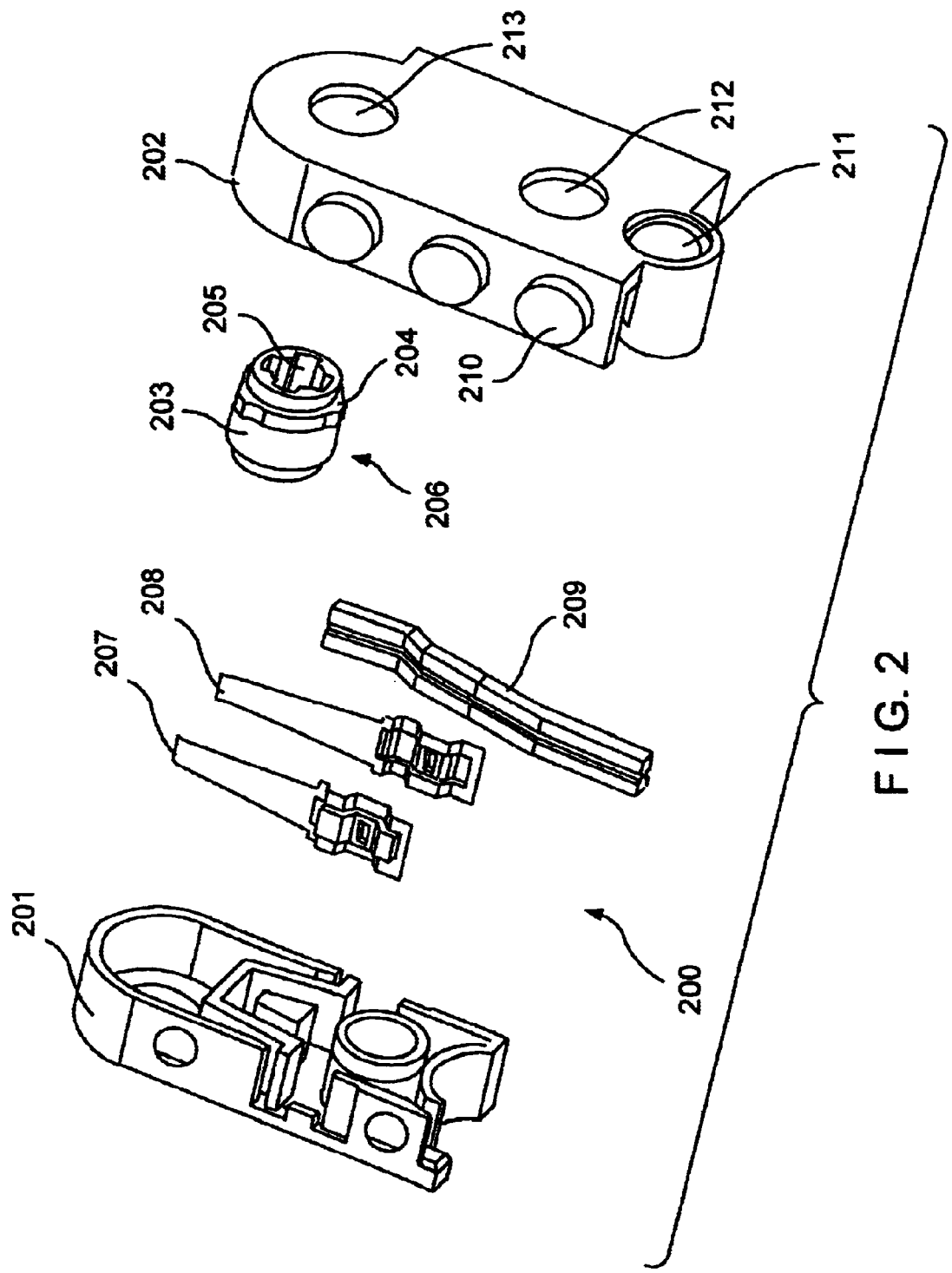
Figure 4:
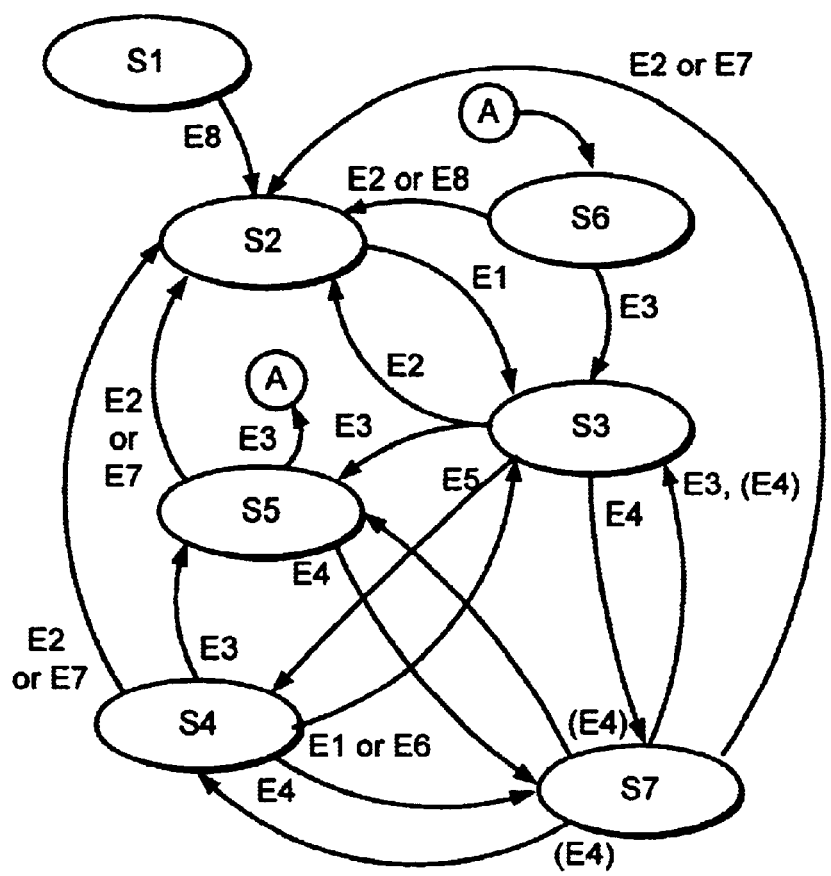
Figure 5:
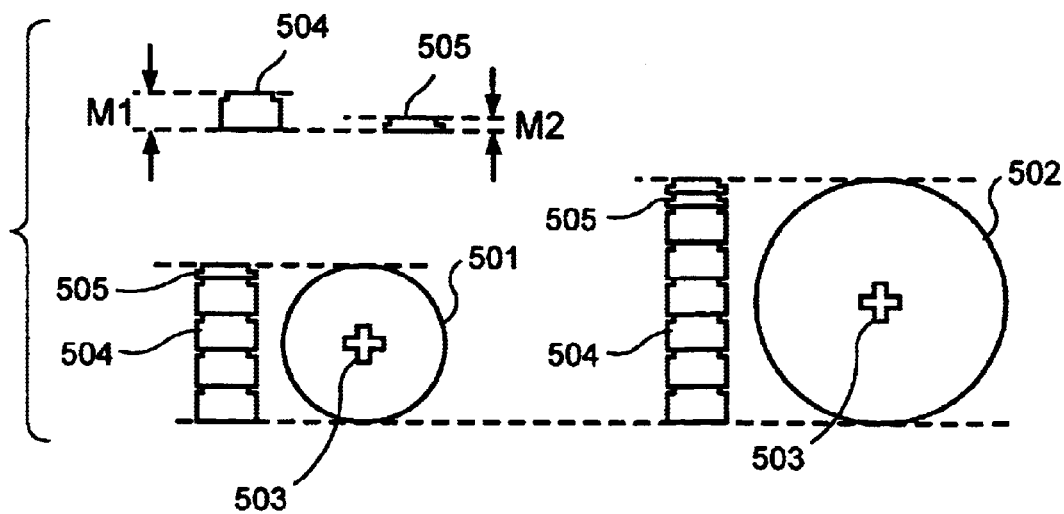
Figure 6:
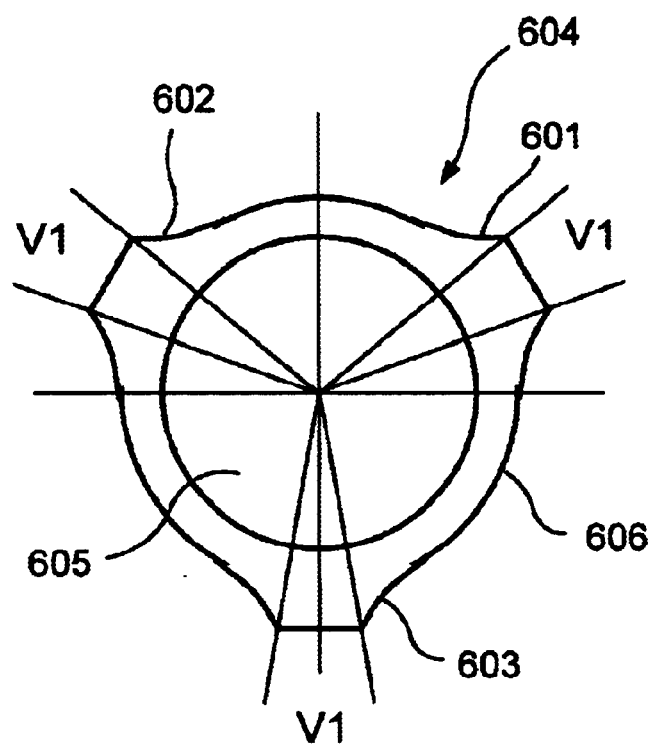
Figure 7:
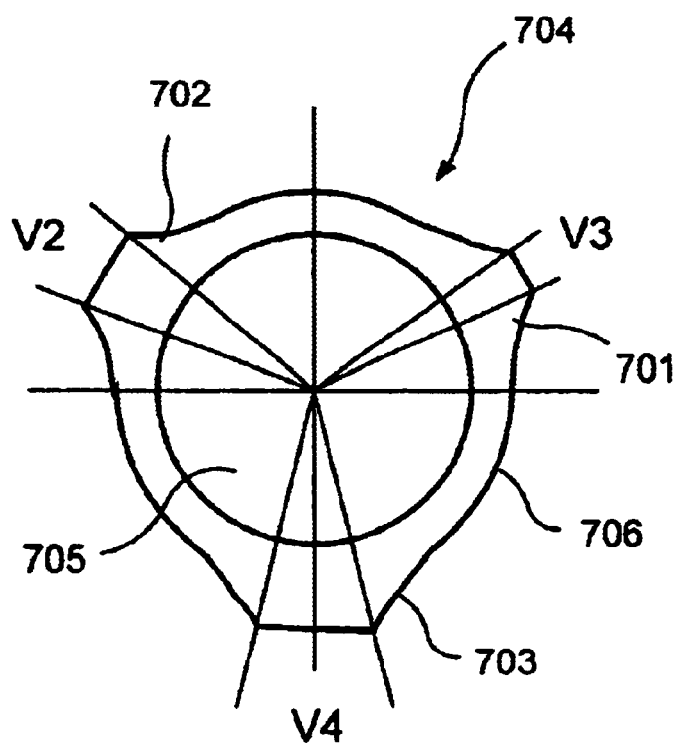

FIG. 1 shows a preferred embodiment of a first building element which contains a computer according to the invention, FIG. 2 shows a preferred embodiment of a second building element which constitutes a sensor according to the invention, FIG. 3 shows a block diagram of a system comprising a computer and a sensor according to the invention, FIG. 4 shows a state diagram with states for the computer and conditions for changing state, FIG. 5 shows three wheels and their respective sizes in modular units, FIG. 6 shows a cam seen from the side, and FIG. 7 shows an alternative embodiment of a cam.

FIG. 1 shows a preferred embodiment of a first building element which contains a computer according to the invention. The building element 1 is shown a) from above, b) from the side, c) from below, d) from the front, e) obliquely from below, and f) obliquely from above.

The building element 101 consists of three main parts: A front 102, an intermediate member 103 and a rear plate 104. The front 102 gives access to two keys F1 and F2, which are called a function key and a state key, respectively The detailed function of these keys will be described later. With a view to coupling the building element 101 to other building elements, the front comprises coupling means in the form of two coupling studs 105 and 106. The coupling studs 105 and 106 are shaped as closed cylinders. The rear plate 104 comprises a plurality of complementary coupling means 107 in the form of a plurality of open cylinders 107. The rear plate 104 moreover comprises locking means 108 so that the rear plate can be removed by displacement and thereby give access to a battery (not shown).

The building element 101 has a conduit 109 so that a wire may be run out of the building element 101 for connection to a sensor.

FIG. 2 shows a second building element disassembled. When the building element is assembled, it can serve as a sensor. The building element 200 comprises an outer part 202 and an inner part 201. The outer part 202 comprises coupling means 210 in the form of plurality of open cylinders 210. Further, the outer part 202 has three through holes 211, 212, and 213. Each of the holes can receive a shaft (not shown). The holes 211 and 212 are intended for connecting the building element with other building elements. The hole 213 can receive a shaft with a view to detecting rotation of it. The outer part 212 is moreover hollow so that that inner part 210 may be mounted inside the outer part 202.

When the inner part 201 and the outer part 202 have been assembled, these two parts can hold a union 206 so that the union can rotate when it is affected. The union 206 is formed with a cross-shaped hole 205 and with three bosses 204. The bosses 204 are formed as an integrated part of a cam 214 mounted on the union and made of a non-electrically conducting plastics material. The union 206 moreover has a surface or a cylinder 203 of an electrically conducting material. This face is also called a contact face.

The inner part 201 is shaped such that it can secure two contact arms 207 and 208 as well as a wire 209 having two conductors. The contact arm 207 is made of a resilient material and is secured so as to engage the cylinder 203 to thereby make electrical contact between the cylinder 203 and the contact arm 207. The contact arm 208 is likewise made of a resilient material and is secured so as to be engagable with the cylinder 203 to thereby make electrical contact between the cylinder and the contact arm 208, while allowing a boss 204 to affect the contact arm 208 such that the electrical contact is interrupted. One of the two conductors of the wire is connected to the contact arm 207, and the other conductor is connected to the contact arm 208.

When an electrical voltage is applied to one conductor, it will be possible to detect a signal on the other conductor which represents a rotation of the union 206. The electrical voltage may e.g. be a battery voltage of 3 volts.

FIG. 3 shows a block diagram of a system comprising a computer and a sensor according to the invention. The sensor may e.g. be the sensor 101 shown in FIG. 2, and the computer may e.g. be constructed as a digital microcomputer mounted in a building element 101 as shown in FIG. 1. The system comprises a sensor 301 and a display 302, both connected to a microcomputer 303 which receives power from a battery 304. The sensor emits a pulsating signal S when it is connected, so that it can detect revolution of a wheel or another element. The sensor can emit one or more pulses per revolution of the union 206 depending on the structure of the sensor.

With a view to measuring a speed, the pulsating signal S is converted into a signal RPM which represents a number of revolutions per unit of time in the converter S/RPM 305. The number of revolutions is converted into a number of revolutions per unit of time on the basis of a clock signal from the timer 310.

Digital values of the signal RPM are then multiplied by a factor, which is obtained from the table 309, by means of the multiplier 307. The result V of the multiplication is sent to the display 302 for reading of a speed.

With a view to recording a maximum speed, the signal from the multiplier 307 is sent to a maximum value detector 311 which records a value of the highest measured speed M over an interval of time. This value is sent to the display 302 for reading of the value.

In order to be able to measure a distance covered, the pulsating signal S is sent to a counter 306 which counts the number of pulses in the signal S and converts it into a signal R which represents a number of revolutions over an interval of time. The signal R is multiplied by means of the multiplier 308 by a factor which is obtained from the table 309. The result of the multiplication D is sent to the display 302 for reading of a distance covered.

The keys F1 and F2 are used for selecting which functions in the computer are to be activated, and which type of values is to be displayed on the display.

With a view to setting the computer to various wheel sizes, a suitable factor must be selected. According to the invention, such a factor is selected by stating the size of the wheel which is to be used in the measurement of a speed or a distance covered. The diameter of the wheel is determined by stacking a suitable number of building blocks on top of each other until the stack of blocks matches the diameter of the wheel. Then the number of blocks is counted, and this number is selected by means of the keys F1 and F2, while a possible modular measure F is displayed on the display. The selection may e.g. be made by going through a list of possible modular measures and selecting a modular measure from the list by one of the keys.

The table 309 contains associated values of modular measures and factors which are to be used for a number of revolutions to be converted into a distance covered or a speed.

In a preferred embodiment of the invention, it is possible to choose between a plurality of different displays on the display. For example, it is possible to choose between having a value of a distance covered or a speed displayed—the values may moreover be displayed with various units. The table is therefore arranged such that for each modular measure there is a factor for each possible display. Typically, such a factor will be a real number with a so-called floating point representation.

Particular when few keys, e.g. two, are at disposal for operating the computer, it is convenient that these factors may be selected merely by selecting a suitable modular measure which represents e.g. the diameter of the wheel. Hereby, the values that may be selected, that is the modular measures, can be limited to a reasonable number, and the setting procedure can thereby be performed more rapidly. Of course, this requires that the individual factors have been stored in the system in advance.

TABLE 1

| Modular measure | Factor |
|---|---|
| 2 | 0.0723 |
| 2_1 | 0.0844 |
| 2_2 | 0.0965 |
| 3 | 0.1085 |
| 3_1 | 0.1206 |
| . | . |
| . | . |
| . | . |
| 10_1 | 0.3739 |
| 10_2 | 0.3860 |
| 11 | 0.3981 |
| 11_1 | 0.4101 |
| 11_2 | 0.4222 |

Table 1 shows an example of associated values of modular measures and a factor. In the example shown, the factor corresponds to the factor which is used when a speed is to be measured in kilometers per hour [KMH].

The table just shows values for one factor in the form of the column "factor". In a practical embodiment, there is a column for each factor corresponding to a desired display. Alternatively, there must be more tables.

It is described below how to navigate between a number of states of the system.

FIG. 4 shows a state diagram with states of the system and conditions of changing state. When the system does not receive any power, it is in the state S1. However, the system will immediately change to the state S2 when the system receives a form of power, e.g. from a battery.

The system may be brought from the state S2 to the state S3, which is a state where a speed may be measured when a revolution signal is received from the sensor. The system may be brought from the state S3 to the states S4, S5, and S7. The state S4 is a state where a maximum speed may be recorded and stored over a period. The state S5 is a state where a distance covered may be measured when a revolution signal is currently received from the sensor. The state S7 is a state where a user can set the computer to a wheel size concerned by means of the keys F1 and F2. The system may be brought from the state S5 to the state S6 which is a so-called stop watch state. It is shown in table 2 below how the abbreviations for the various events (E1, E2, . . . E9) used in FIG. 4 are to be interpreted.

TABLE 2

| Event | |
|---|---|
| E1 | F1 affected once |
| E2 | F1 kept depressed for 3 sec. |
| E3 | F2 affected once |
| E4 | F2 kept depressed for 2 sec. |
| E5 | No sensor activity for 1 sec. |
| E6 | Sensor activity detected |
| E7 | Neither F1 nor F2 affected for 2 min. |
| E8 | Neither F1 nor F2 affected for 12 min. |
| E9 | Battery inserted |

Table 2 shows how the abbreviations used in FIG. 4 are to be interpreted. It will be obvious to a skilled person to detect the various events.

The possibilities of changing between states as shown in FIG. 4 are moreover stated in table 3 below. For example, it will be seen by reading row S2 in table 3 that event E1 will be capable of bringing the system from state S2 to state S3. It will likewise be seen by reading row S3 in table 3 that the events E2, E3, E4, E5 will be capable of bringing the system from state S3 to one of the respective states S2, S5, S7 or S4.

TABLE 3

| S/E | E1 | E2 | E3 | E4 | E5 | E6 | E7 | E8 | E9 |
|---|---|---|---|---|---|---|---|---|---|
| S1 |    |    |    |    |    |    |    |    | S2 |
| S2 | S3 |    |    |    |    |    |    |    |    |
| S3 |    | S2 | S5 | S7 | S4 |    |    |    |    |
| S4 | S3 | S2 | S5 | S7 (S3) |    | S3 | S2 |    |    |
| S5 |    | S2 | S6 | S7 (S5) |    |    | S2 |    |    |
| S6 |    | S2 | S3 |    |    |    |    | S2 |    |
| S7 |    | S2 | S3 |    |    |    | S2 |    |    |

Table 3 shows which event (E1, E2, . . . E9) is necessary for the system to change state (S1, S2, . . . S7). The bracketed states in the table are states to which the system automatically returns.

The individual states will be described more fully below.

State S2: In this state, the computer is turned off and the display is inactive to reduce the power consumption from the battery.

State S3: In this state, a speed may be measured. If F1 is affected once (E1), values of distance covered, stop watch times, and maximum values of speed are erased. If F1 and F2 are affected at the same time (E1 AND E3), selection is possible between the units revolutions per minute [RPM], kilometers per hour [KHM], and miles per hour [MPH]. The selected unit is displayed on the display.

When the unit of the speed is revolutions per minute [RPM], the value to be displayed on the display may be calculated as the number of detected pulses per second multiplied by the number 20.0.

When the unit of the speed is kilometers per hour [KHM], the value to be displayed on the display may be calculated as the number of detected pulses per second multiplied by a factor which is the modular diameter divided by the number 265.26. The modular diameter may assume values between 19.2 mm and 112.0 mm in steps of 3.2 mm. The calculated factor values may be stored in the table 309. The jump of 3.2 mm corresponds to the height of the lowest building element.

When the unit of the speed is revolutions per minute [RPM], the value to be displayed on the display may be calculated as the number of detected pulses per second multiplied by the number 20.0.

State S4: In this state, maximum values of a speed calculated in state S3 are recorded. If a new value is greater than a value recorded previously, this new value is displayed on the display as a maximum speed. The events E1 and (E1 AND E3) have the same functions as in state S3.

State S5: In this state, a distance covered is calculated. If F1 is affected once (E1), values of distance covered, stop watch times, and maximum values of speed are erased. If F1 and F2 are affected at the same time (E1 AND E3), selection is possible between the units revolutions, metre and foot. The selected unit is displayed on the display.

When the unit of the distance covered is meter (M), the value to be displayed on the display may be calculated as a number of pulses detected over a period multiplied by a factor which is the modular diameter divided by the number 954.93. The modular diameter corresponds to the modular diameter in state 3 and may likewise assume values between 19.2 mm and 112.0 mm in steps of 3.2 mm. The calculated factor values may be stored in the table 309.

When the unit of the distance covered is revolutions (R) the value to be displayed on the display may be calculated as a number of pulses detected over a period multiplied by a factor which is the modular diameter divided by the number 3 (assuming that three pulses per revolution are received from the sensor).

State S6: In this state, the computer serves as a stop watch. When sensor activity (E6) is detected, the stop watch is started. When no sensor activity is detected (E5), the stop watch is stopped and the time elapsed is displayed on the display.

State S7: In this state, a modular diameter may be selected.

As described above, the modular diameter is determined by stacking a suitable number of building blocks on top of each other until the stack of blocks matches the diameter of the wheel. Then the number of blocks is counted, and this number is selected by means of the keys F1 and F2, while a possible modular measure is displayed on the display.

It applies in general to the individual states that an icon is displayed on the display, showing which state the system has to thereby assist the person who operates the system.

FIG. 5 shows three wheels and their respective sizes in modular units. The wheel 501 has a height measured in building elements corresponding to 4 high building elements 504 and 1 low building element 505. The wheel 503 has a height measured in building elements corresponding to 6 high building elements 504 and 2 low building elements 505. By measuring a wheel size in this manner it is easy for a child to set the computer to a wheel size concerned.

As will appear from the figure, the building elements 504 have a height corresponding to the modular measure M1. The building elements 505 have a height corresponding to the modular measure M2. Furthermore, the modular measures M1 and M2 are adapted such that $M1=3\times M2$—that is the high building elements 504 have a height corresponding to three low building elements 505 stacked on top of each other. In a preferred embodiment, the building elements have coupling means for mutual coupling. The coupling means are preferably of the type 107 and 105/210 as well as optionally of the type 211/212.

The wheels 501 and 502 may be coupled to the sensor by means of a cross-shaped shaft (not shown). A shaft may be passed through a cross-shaped hole 503 in a wheel and through the cross-shaped hole in the union in the sensor.

FIG. 6 shows a cam seen from the side. The cam 604 has three bosses 601, 602 and 603. The bosses are offset about 120° relative to each other along the periphery 606 of the cam. Each of the bosses has an extent along the periphery of the cam corresponding to the angle V1.

As mentioned before, the bosses are arranged so that they can affect a contact arm to thereby interrupt an electrical contact. For the cam 604, the electrical contact will be interrupted three times by a single revolution of the cam (mounted on the union 206). Each interruption temporally corresponds to the fraction V1 [°]/360° of the time a revolution takes. Of course, this requires that the cam is rotated at a constant angular speed about a shaft with the centre through the hole 605.

Moreover, the cam has a hole 605 which is shaped to allow it to be mounted around the union 206 so that the two parts are kept together.

FIG. 7 shows an alternative embodiment of a cam. This cam also has three bosses 701, 702 and 703 offset about 120° relative to each other along the periphery 706 of the cam 704. But in this embodiment the bosses have mutually different extents. The boss 702 has an extent corresponding to the angle V2, the boss 701 has an extent V3, and the boss 703 has an extent V4. As will also be seen in the figure, the angle V3 is smaller than the angle v2 and the angle v2 is smaller than the angle V4.

For the cam 704, the electrical contact will likewise be interrupted three times by a single revolution of the cam (mounted on the union 206). However, the interruption will depend on which boss affects the contact arm. When the boss 701 affects the contact arm during rotation of the cam, the interruption temporally corresponds to the fraction V3 [°]/360° of the time a revolution takes. Correspondingly, the boss 702 will interrupt the contact for a time corresponding to the fraction V2 [°]/360° of the time a revolution takes. This may be utilized for detecting which way the union 206 rotates. The computer 303 may be adapted to detect this direction of revolution on the basis of the following strategy: If first a short interruption is detected (the boss 701 affects the contact), then a longer interruption (the boss 702 affects the contact, and then again a longer interruption (the boss 703 affects the contact), the cam or the union rotates clockwise. Alternatively, if first a relatively short interruption is detected (the boss 701 affects the contact), then a second relatively long interruption (the boss 703 affects the contact), and then again an interruption longer than the first interruption, but shorter than the second interruption, the cam or the union rotates counter-clockwise.

The hole 705 in the cam makes it possible to mount it in a firm connection with the union 206.

It should be noted that the cam may be formed with more bosses, e.g. 4, 5 or 6 bosses. If the information on the direction of revolution is not relevant, there may also be fewer bosses, e.g. 1 boss or 2 bosses.

The invention may be caused to work in many ways in addition to the embodiment described above. For example, said factor may be selected so that the computer, when used in a model car in a given scale of e.g. 1:20, shows a simulated speed of e.g. 100 km/h instead of a real speed of 5 km/h.

In the embodiment of the sensor and the computer described above, these are separated in two building elements. However, the sensor and the computer may be integrated in a single building element. It will moreover be possible to use other forms of sensors e.g. based on a magnet principle as is known from bicycle computers.

As an alternative to specifying the size of a wheel on the basis of its diameter, the computer may be adapted such that the size may be specified on the basis of the radius of the wheel.

What is claimed is:

1. A toy building set comprising:

a wheel;

a sensor for generating a signal indicating rotation of said wheel;

a computer including a display, said computer being connected to said sensor and receiving said signal;

said sensor comprising a coupling means for coupling to building elements having complementary coupling means, said coupling means including a plurality of modular units; and said display displaying a value based on said signal and a factor based on a transverse dimension of said wheel.

2. The toy building set of claim 1 further comprising building elements with an outer dimension corresponding to an integer multiple of a number of said plurality of modular units.

3. The toy building set of claim 1 wherein said building elements include said coupling means and said complementary coupling means.

4. The toy building set of claim 1 further comprising a plurality of elements which can be built on top of each other and be used as a measure by counting a number of said elements.

5. The toy building set of claim 1 wherein said sensor is formed with an aperture which mounts a connector with a cross-shaped aperture for receiving a shaft with a cross-shaped cross section.

6. The toy building set of claim 5 wherein:

said connector includes at least one boss which rotates in concert therewith and further includes an outer contact face; and said sensor includes a first contact arm and a second contact arm which arm mounted to engage said contact face, wherein said second contact arm is periodically lifted from said contact face by said at least one boss during rotation of said connector.

7. The toy building set of claim 6 wherein said at least one boss includes at least three bosses with different widths, thereby allowing said computer to determine a direction of rotation of said connector based on said signal.

8. The toy building set of claim 1 wherein said computer includes a memory for storage of modular values and conversion factors.

9. The toy building set of claim 1 wherein said factor is dependent upon a scale factor.

10. The toy building set of claim 1, wherein said computer has the following states of operation selected by a user:

a stop watch state wherein time elapsed is measured and displayed on said display;

a speed state wherein said signal is converted to a speed based on said factor, wherein said speed is displayed on said display;

a distance state wherein a distance covered by said wheel is calculated and displayed on said display; and a calibration state wherein a transverse dimension of said wheel is specified.

11. The toy building set of claim 1 further including building elements including cross-shaped shafts and wheels arranged to receive such a cross-shaped shaft.

12. The toy building set of claim 1 wherein said coupling means comprises cylindrical coupling studs and wherein said complementary coupling means receives said cylindrical coupling studs thereby establishing interconnection of two building elements.

* * * * *